(12) United States Patent
Chelst et al.

(10) Patent No.: US 9,208,528 B2
(45) Date of Patent: Dec. 8, 2015

(54) SYSTEMS AND METHODS FOR EXPENSE MANAGEMENT

(71) Applicant: American Express Travel Related Services Company, Inc., New York, NY (US)

(72) Inventors: Azriel Chelst, Woodmere, NY (US); Estelle Mangeney, New York, NY (US); Lee Pham, New York, NY (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 316 days.

(21) Appl. No.: 13/652,770

(22) Filed: Oct. 16, 2012

(65) Prior Publication Data

US 2014/0105510 A1 Apr. 17, 2014

(51) Int. Cl.
*G06K 9/68* (2006.01)
*G06Q 40/00* (2012.01)

(52) U.S. Cl.
CPC .................................. *G06Q 40/125* (2013.12)

(58) Field of Classification Search
None
See application file for complete search history.

(56) References Cited

U.S. PATENT DOCUMENTS

| | | | |
|---|---|---|---|
| 6,745,936 B1 | 6/2004 | Movalli et al. | |
| 7,069,240 B2 * | 6/2006 | Spero et al. | 705/30 |
| 7,082,415 B1 | 7/2006 | Robinson et al. | |
| 7,783,515 B1 * | 8/2010 | Kumar et al. | 705/16 |
| 8,392,288 B1 | 3/2013 | Miller | |
| 8,392,310 B1 * | 3/2013 | Praisner et al. | 705/36 T |
| 2002/0010681 A1 | 1/2002 | Hillegass et al. | |
| 2002/0016739 A1 | 2/2002 | Ogasawara | |
| 2002/0099663 A1 | 7/2002 | Yoshino et al. | |
| 2002/0198936 A1 | 12/2002 | McIntyre et al. | |
| 2003/0182204 A1 | 9/2003 | Rhee | |
| 2003/0225701 A1 | 12/2003 | Lee et al. | |
| 2003/0233279 A1 | 12/2003 | Shinzaki | |
| 2004/0024688 A1 | 2/2004 | Bi et al. | |
| 2004/0039916 A1 | 2/2004 | Aldis et al. | |
| 2004/0049423 A1 | 3/2004 | Kawashima et al. | |
| 2004/0243489 A1 * | 12/2004 | Mitchell et al. | 705/30 |
| 2007/0045405 A1 | 3/2007 | Rothschild | |
| 2007/0156579 A1 | 7/2007 | Manesh | |
| 2007/0288394 A1 | 12/2007 | Carrott | |
| 2008/0035724 A1 | 2/2008 | Vawter | |
| 2009/0164344 A1 | 6/2009 | Shiftan et al. | |

(Continued)

OTHER PUBLICATIONS

Office Action dated Sep. 9, 2014 in U.S. Appl. No. 13/827,605.

(Continued)

*Primary Examiner* — Daniel Mariam
(74) *Attorney, Agent, or Firm* — Snell & Wilmer L.L.P.

(57) ABSTRACT

Systems, methods, and articles of manufacture for expense management are disclosed. A user may submit receipts for one or more transactions into an expense management system. The expense management system may extract information from the receipts and match the extracted information to one or more of a plurality of Records of Charge (ROCs). The expense management system may match the extracted information to a ROC based on vendor name, location, time stamp, and the like. The expense management system may further assign a ROC to an expense category. The expense management system may assign a ROC to an expense category based on a standard industrial classification (SIC) code of a merchant, a category assigned to a different ROC, and a location associated with the ROC. An expense report for all submitted receipts may be generated.

20 Claims, 7 Drawing Sheets

(56) References Cited

U.S. PATENT DOCUMENTS

| | | |
|---|---|---|
| 2009/0271265 A1 | 10/2009 | Lay et al. |
| 2010/0061655 A1* | 3/2010 | Ma .................................. 382/275 |
| 2010/0257066 A1 | 10/2010 | Jones et al. |
| 2010/0332240 A1 | 12/2010 | Somuah et al. |
| 2012/0078682 A1* | 3/2012 | Pinsley et al. ................. 705/7.29 |
| 2012/0185368 A1* | 7/2012 | Schloter et al. .................. 705/30 |
| 2012/0221446 A1* | 8/2012 | Grigg et al. ...................... 705/30 |
| 2012/0259748 A1* | 10/2012 | Young et al. ..................... 705/34 |
| 2013/0129218 A1* | 5/2013 | Barrett et al. .................. 382/182 |
| 2013/0332210 A1* | 12/2013 | Wyganowski et al. ........ 705/7.13 |
| 2014/0074675 A1* | 3/2014 | Calman et al. ................... 705/35 |
| 2014/0214652 A1* | 7/2014 | Zheng et al. ..................... 705/39 |

OTHER PUBLICATIONS

Final Office Action dated Feb. 13, 2015 in U.S. Appl. No. 13/827,605.
Advisory Action dated Mar. 30, 2015 in U.S. Appl. No. 13/827,605.

* cited by examiner

SYSTEMS AND METHODS FOR EXPENSE MANAGEMENT

BACKGROUND

1. Field

The present disclosure relates to the field of finance management, and in particular, relates to expense management.

2. Related Art

In many transactions between a merchant and a customer, the merchant provides the customer with a receipt having all details of the transactions, such as the amount, date, identifier, etc., for that transaction. These receipts are often required in an acceptable condition for various personal and business reasons. Companies and business professionals request receipts for the purpose of reimbursements, record keeping, and the like. Further, any individual may also want to keep receipts securely in order to have a proof of purchase so that any defective purchased item may be replaced at a later stage.

Many times these receipts are torn, faded or lost, thus causing the customer inconvenience in the future. Further, if an individual wants to submit all his expense receipts at once, it is very difficult and cumbersome due to the large amount of receipts. Also, the individual may need to complete detailed expense reports for all expenses incurred during a fixed period of time (e.g., a month), before submitting the report to an accounting department. The submitting of receipts and completing of expense reports are often tedious and difficult.

In the case of reimbursements, a professional may securely keep his receipts, corresponding to expenses incurred while working for different clients, and submit these receipts to accounting departments of the different clients. However, due to multiple receipts corresponding to the different clients, it may be possible that the professional submits receipts of expenses incurred for a client to the accounting department of another client. Such a mistake may result in chaos and difficulties for both the professional and the clients.

It would therefore be desirable to provide a method and system that overcomes these and other problems associated with current techniques for expense management.

SUMMARY

The present disclosure includes a system, method, and article of manufacture for expense reporting. In various embodiments, the method may comprise receiving an image of a receipt, retrieving a record of charge (ROC) associated with a transaction account in response to the receiving, and matching the image of the receipt to the ROC based upon information acquired from the image of the receipt. A receipt may be processed, and matching facilitated, by way of an optical character recognition process. The method may further include assigning the ROC to a category of expense, e.g., based upon at least one of: a standard industrial classification (SIC) code of a merchant, a category assigned to a different ROC, and a location associated with the ROC. Further, in various embodiments, the image of the receipt may be matched to the ROC based upon at least one of: a merchant identifier acquired from the image, a transaction identifier acquired from the image, a time stamp acquired from the image, and a total amount of a transaction acquired from the image. Similarly, in various embodiments, a plurality of images of a plurality of receipts may be matched to a plurality of ROCs. Matched ROCs may be submitted to an expense management system.

In various embodiments, the method may comprise receiving a record of charge (ROC), requesting an image of a receipt associated with the ROC in response to the receiving the ROC, and matching the image of the receipt to the ROC in response to receiving the image of the receipt. An image of a receipt may be matched to a ROC, in certain embodiments, in response to receiving the image of the receipt within a period of time after transmitting the alert. In various embodiments, the method may further include receiving an image of encoded data printed on the receipt separate from the image of the receipt. Further, a ROC may be assigned to a category of expense, e.g., based upon at least one of: a standard industrial classification (SIC) code of a merchant, a category assigned to a different ROC, and a location associated with the ROC. A ROC may be further assigned to a client and/or a project, and an image of a receipt, having been matched to ROC, submitted to an expense management system.

In addition, in various embodiments, the method may comprise receiving a record of charge (ROC) transmitting an alert requesting an image of a receipt associated with the ROC receiving an instruction to delay matching the image of the receipt to the ROC, and matching the image of the receipt to the ROC in response to receiving the image of the receipt and based upon information acquired from the image of the receipt. An instruction to delay matching may comprise inaction by a customer in response to the alert, although it may also comprise an explicit instruction to delay. In addition, an image of a receipt may be matched to a ROC in response to receiving the image of the receipt after a period of time has elapsed and based upon information acquired from the image of the receipt. Moreover, in various embodiments, an image of the receipt may be matched to a ROC based upon at least one of: a merchant identifier acquired from the image, a transaction identifier acquired from the image, a time stamp acquired from the image, and a total amount of a transaction acquired from the image.

BRIEF DESCRIPTION OF THE DRAWINGS

The features and advantages of the present disclosure will become more apparent from the detailed description set forth below when taken in conjunction with the drawings. The left-most digit of a reference number identifies the drawing in which the reference number first appears.

DETAILED DESCRIPTION

Figure 1:
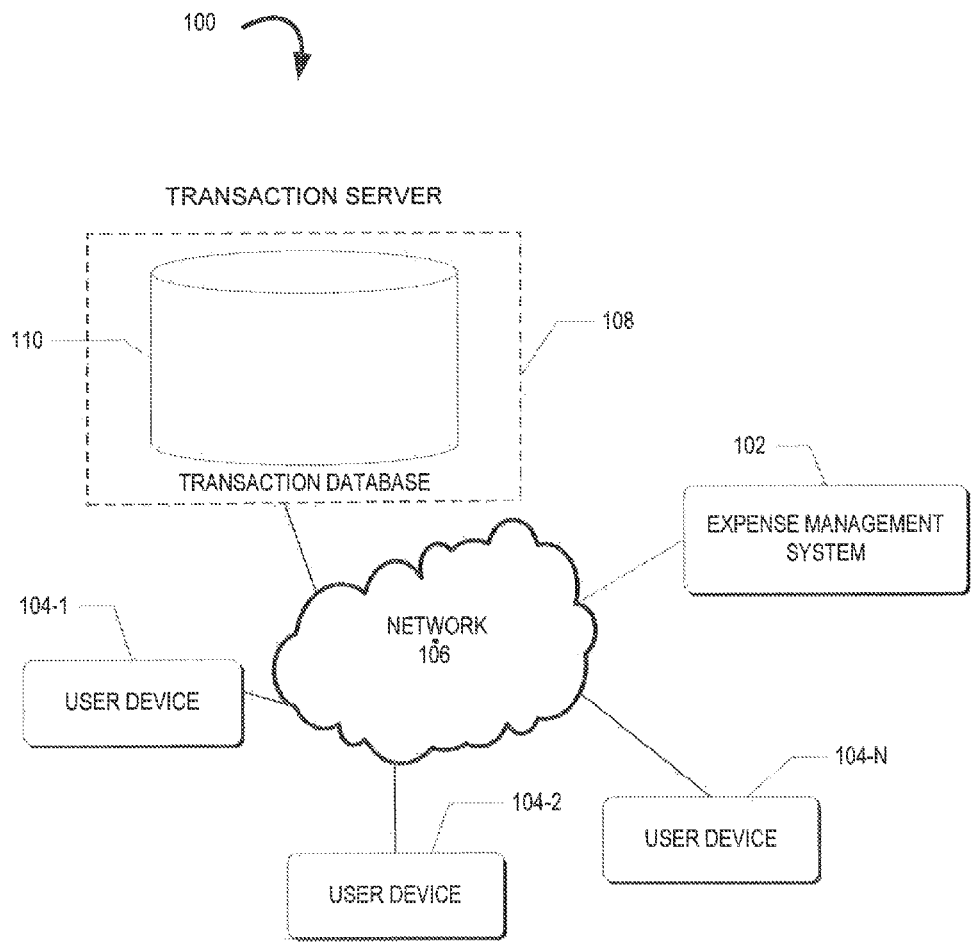
FIG. 1 illustrates an exemplary expense management system in accordance with various embodiments.

The detailed description of various embodiments herein makes reference to the accompanying drawings, which show the various embodiments by way of illustration and their best mode. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

The phrases consumer, customer, user, account holder, cardmember or the like shall include any person, entity, business, government organization, business, software, hardware, machine associated with a transaction account, buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account. In addition, as used herein, a user may comprise, in various embodiments, any person who interacts and/or interfaces with a computer system (e.g., an organizational and/or an employer computer system).

Phrases and terms similar to "transaction account" may include any account that may be used to facilitate a financial transaction.

Phrases and terms similar to "financial institution" or "transaction account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

Phrases and terms similar to "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

A system, method, and/or article of manufacture for expense management is disclosed. In various embodiments, an expense management system may receive one or more receipts, corresponding to expenses incurred by a user, from one or more user devices. The receipts may be provided to the user by multiple vendors or service providers. The receipts may be received by the expense management system in a digital copy format. The digital copy of the receipts may be obtained from a camera, or by scanning the receipts using a scanner. Further, the digital copy may be of any image format such as, JPEG, GIF, PNG, etc., or any document format such as, PDF, DOC, XPS, etc.

In response to the receiving of receipts, the expense management system may connect to a transaction server, in order to retrieve a plurality of records of charge (ROCs) associated with the transactions for which the digital copies of the receipts are submitted. The ROC, in an example, may be a unique identifier associated with a transaction performed by the user by using a transaction card, such as, a gift card, a debit card, a credit card, and the like, linked to a transaction account. The ROC may contain details such as location, vendor's name, total amount, and the like for the transaction. Based on the information identified from the digital copy of the receipt, the expense management system may match the digital copy of the receipt to one of the plurality of ROCs based on a merchant identifier acquired from the digital copy, a transaction identifier acquired from the digital copy, a total amount of a transaction acquired from the digital copy, and the like. Subsequent to matching of the digital copies of the receipts to one of the plurality of ROCs, the matched ROC may be assigned to an expense category, for example, based upon a standard industrial classification (SIC) code of a merchant, a category assigned to a different ROC, and the like. The expense management system may also generate an expense report for all submitted receipts.

FIG. 1 shows an exemplary network environment 100, in which various embodiments of the present invention may be deployed. As shown in the FIG. 1, the exemplary network environment 100 includes an expense management system 102, one or more user devices 104-1 . . . 104-N, herein collectively referred as the user devices 104 and individually referred as the user device 104. The network environment 100 may further include a transaction server 108. The expense management system 102, the transaction server 108, and the user devices 104 may communicate over a network 106.

The expense management system 102 may be configured to receive digital copies of one or more receipts, corresponding to the expenses incurred by the user, via the user devices 104.

A user device 104 may be any device capable of transmitting data, such as the digital copies of the receipts, to the expense management system 102. Examples of the user devices 104 may include, without limitation, personal computers, cellular communication devices, Hand-Held display devices, smartphones, personal digital assistants (PDAs), tablets, notebook computers, and the like. In various embodiments, a user device 104 may comprise a tablet or table computing device, such as, for example, a MICROSOFT SURFACE table. The user device 104 may also be capable of generating the digital copies of the receipts, for example, by photographing the receipts or scanning the receipts. The user devices 104 may include suitable hardware and/or software for connecting to the expense management system 102 through the network 106. An exemplary expense management system 102 is described in more detail in conjunction with FIG. 2 and FIG. 3.

With further regard to user devices 104, such devices may, in various embodiments, include any device (e.g., personal computer, point of sale or POS device) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, mobile phones, smart phones, personal digital assistants, set-top boxes, workstations, computer-servers, main frame computers, mini-computers, PC servers, pervasive computers, network sets of computers, personal computers, such as iPads, iMACs, and MacBooks, kiosks, terminals, point of sale (POS) devices and/or terminals, televisions, or any other device capable of receiving data over a network. A web-client 102 may run Microsoft Internet Explorer, Mozilla Firefox, Google Chrome, Apple Safari, or any other of the myriad software packages available for browsing the internet.

Practitioners will appreciate that a user device 104 may or may not be in direct contact with an application server. For example, a user device 104 may access the services of an application server through another server and/or hardware component, which may have a direct or indirect connection to an Internet server. For example, a user device 104 may communicate with an application server via a load balancer. In an exemplary embodiment, access is through a network or the Internet through a commercially-available web-browser software package.

As those skilled in the art will appreciate, a user device 104 includes an operating system (e.g., Windows NT, 95/98/2000/CE/Mobile, OS2, UNIX, Linux, Solaris, MacOS, PalmOS, etc.) as well as various conventional support software and drivers typically associated with computers. A user device 104 may include any suitable personal computer, network computer, workstation, personal digital assistant, cellular phone, smart phone, minicomputer, mainframe or the like. A user device 104 can be anywhere there is any type of wireless network connectivity (e.g., in a home or business environment with access to a network). In an exemplary embodiment, access is through a network or the Internet through a commercially available web-browser software package. A user device 104 may implement security protocols such as Secure Sockets Layer (SSL) and Transport Layer Security (TLS). A user device 104 may implement several application layer protocols including http, https, ftp, and sftp.

In various embodiments, components, modules, and/or engines of system 100 may be implemented as micro-applications or micro-apps. Micro-apps are typically deployed in the context of a mobile operating system, including for example, a Palm mobile operating system, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app. In various embodiments, a micro-app may be made available as a service.

In various embodiments, the expense management system 102 may be implemented as middleware and may provide various functionalities as a service to organizations, banks and/or individuals deploying the expense management system 102. Thus, in various embodiments, the expense management system 102 may run as a stand-alone application on the user device 104. Further, an organization or an individual may deploy the user device 104 in order to use functionalities of the expense management system 102.

As used herein, network 106 includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE, PALMPILOT, BLACKBERRY), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, Dilip Naik, Internet Standards and Protocols (1998); Java 2 Complete, various authors, (Sybex 1999); Deborah Ray and Eric Ray, Mastering HTML 4.0 (1997); and Loshin, TCP/IP Clearly Explained (1997) and David Gourley and Brian Totty, HTTP, The Definitive Guide (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., Gilbert Held, Understanding Data Communications (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

The transaction server 108 may comprise a computer server having transaction records of users (e.g., associated with user devices 104) stored thereon. An organization, in an example, may be a bank or a credit card service provider, having transaction records of transactions performed by one or more users. An expense management system 102 may communicate with a transaction server 108 to access transaction records of users.

In various embodiments, as user, such as a business professional, who is travelling for business purposes may wish to keep a record of the expenses incurred by him for all or part of a business trip for submitting the record of expenses in his company or an accounting department of a client for whom the user has taken the business trip. Generally, the user may securely keep receipts, provided by vendors and/or service providers, as the record of expense. These receipts may be in a printed or hand-written form. Further, the user may need to submit a complete expense report to his company or the accounting department of the client in order to claim reimbursements.

According to various embodiments, the user may send digital copies of one or more receipts to the expense management system 102. The user may send the digital copies of the receipts to the expense management system 102 through the user device 104. Subsequent to the receiving of the digital copies of the receipts by the expense management system 102, the expense management system 102 may retrieve one or more of a plurality of ROCs from the transaction server 108. A ROC, as described elsewhere herein, may comprise a unique identifier generated when the user performs a transaction using a transaction card, such as, but not limited to, a credit card, a debit card, a gift card, a corporate travel card, and the like.

The expense management system 102 may then utilize the plurality of ROCs and information identified from the digital copies of the receipts, in order to process the receipts for expense management. The expense management system 102 may match the digital copies of the receipts to one of the plurality of ROCs retrieved from the transaction server 108 based on the information identified from the digital copies such as name of vendor or merchant, time of transaction, location of transaction, and the like. Based on this matching, the expense management system 102 may further process the receipts, for example, to generate an expense report for the user.

In various embodiments, an expense management system 102 may perform operations as discussed with reference to FIG. 2. As described elsewhere herein, the user may be provided receipts by multiple vendors or service providers for expenses incurred by the user. For purposes of reimbursements, record keeping, and the like, the user may want to securely save these receipts and also prepare an expense report for a fixed period of time.

Figure 2:
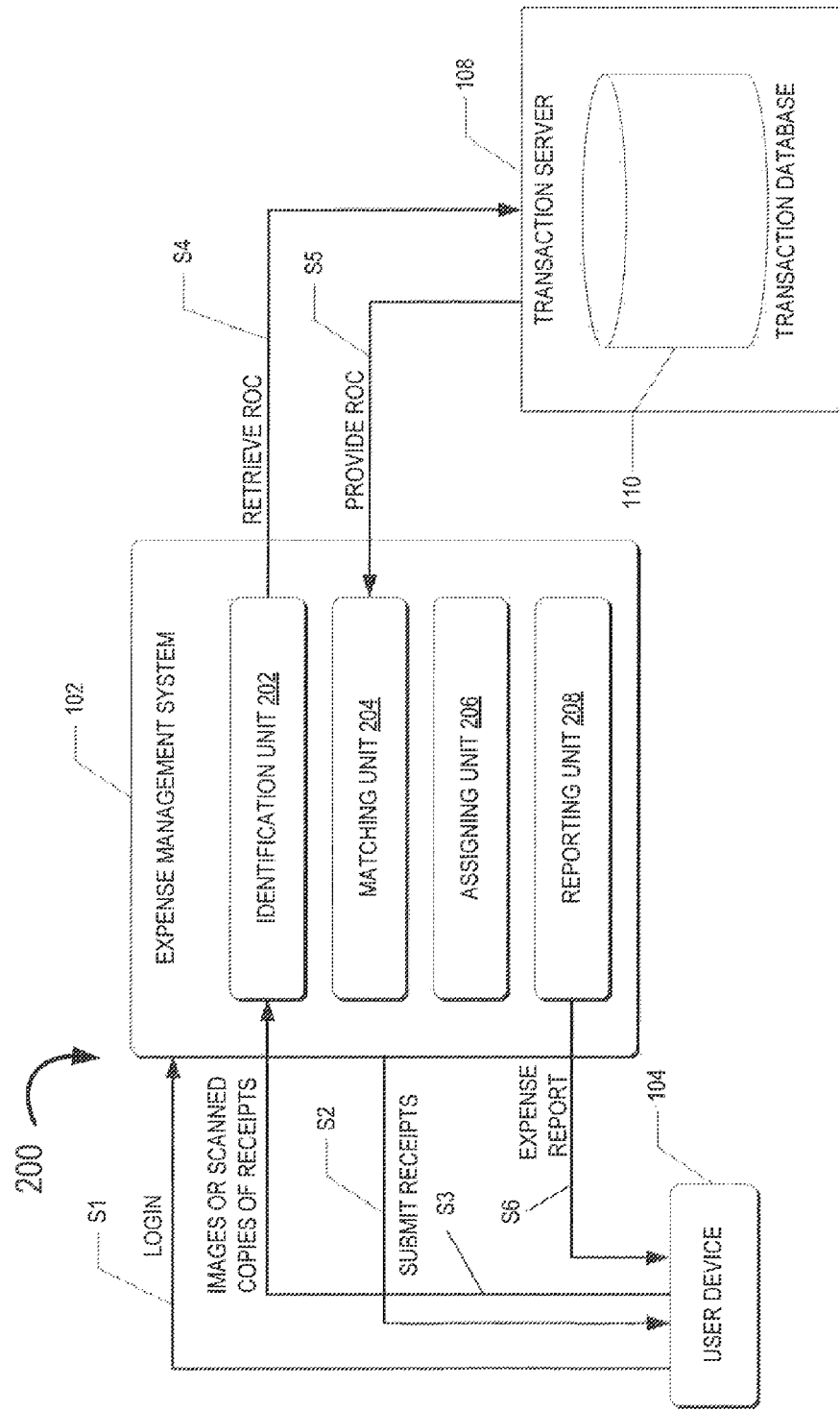
FIG. 2 illustrates an exemplary block diagram of a process within the expense management system in accordance with various embodiments.

As depicted in FIG. 2, to submit digital copies of the receipts, the user may first login to the expense management system 102 (S1). The user may login into the expense management system 102 using a username and a password. The user may also login to the expense management system 102, for example, by swiping a credit card, through which the user has performed transactions, in a card swipe machine (not shown), attached to the user device 104. Further, one or more transaction cards, such as, credit cards, debit cards, ATM cards, gift cards etc. in the name of the user may be registered with the expense management system 102. Based on an authentication of login details entered by the user, the user may be redirected to the expense management system 102 via the user device 104.

As depicted in the block diagram 200, the user may be prompted for submitting one or more receipts, corresponding to transactions performed by the user, to the expense management system 102 (S2). The expense management system 102 may prompt the user, in an example, by sending an alert to the user device 104. The alert may be in the form of an e-mail, a text message, an alarm and the like. In response to receiving the prompt from the expense management system 102, on the user device 104, the user may submit the digital copies of the receipts, to the expense management system 102 (S3). Further, if the user wishes to simultaneously submit more than one receipt in the expense management system 102, the user may do so by generating a single digital copy of all the receipts and directly submitting the single digital copy to the expense management system 102. The expense management system 102 may then automatically segregate or isolate (e.g., using a digital imaging algorithm or system) the receipts from the digital copy.

The digital copies of the receipts may be received by an identification unit 202 of the expense management system 102. In case of a single digital copy containing multiple receipts, as described above, the identification unit 202 may segregate or isolate individual receipts from the digital copy. Further, the identification unit 202 may identify information contained in the digital copies. The identification unit 202 may identify the information contained in the digital copies of the receipts, for example, by an Optical Character Recognition (OCR) process. In an example, the identification unit 202 may identify information such as name of vendor, merchant number, time stamp, total amount, and the like from the digital copies.

Further, in various embodiments, the identification unit 202 may connect to the transaction server 108. As described herein, the transaction server 108 may be a back-end server with a bank or a credit card service provider. The transaction server 108 may communicate with a transaction database 110 to transmit and/or receive details related to the transaction account (e.g., one or more of a plurality of ROCs). A transaction server 108 may further communicate with an expense management system to transmit and/or receive transaction details (e.g., one or more of a plurality of ROCs) (S4 and S5).

The identification unit 202 may connect to the transaction server 108, in an example, for retrieving one or more of a plurality of ROCs associated with one or more transactions performed by the user, from the transaction database 110. For example, in various embodiments, in response to receiving a connection request from the identification unit 202, the transaction server 108 may send a query to the transaction database 110 to retrieve one or more of a plurality of ROCs from the transaction database 110. The transaction server 108 may retrieve one or more ROCs from the transaction database 110 and may then provide the ROC or ROCs to the expense management system 102. The one or more ROCs provided by the transaction server 108 may be received by the matching unit 204 of the expense management system 102.

The matching unit 204 may, in various embodiments, match a receipt (e.g., a digital copy of the receipt) to one of the plurality of ROCs based on the information identified from the digital copy of the receipt. In an example, the digital copy of the receipt may be matched to one of the plurality of ROCs based upon identified information such as merchant identifier, transaction identifier, time stamp, location of transaction, and the like obtained from the digital copy of the receipt. The matching unit 204 may also tag relevant information, extracted or identified from all the digital copies of the receipts, in order to match receipts of similar kinds.

In an example, a user may purchase, with a transaction account, an air ticket worth $200.00 from an airlines service provider, the service provider may provide him with a receipt for the transaction along with the air ticket. The receipt may indicate the total amount, i.e. $200.00, the date of the transaction, the service provider's name, and the like. If the user wishes to claim the amount of the air ticket from his company or organization, he may submit a digital copy of the receipt in the expense management system 102. The user may first login in to the expense management system 102, in an example, by using a username and a password. The user may also login by swiping the credit card, from which the transaction was made, into the card swipe machine connected with the user device 104. After receiving a successful login message from the expense management system 102, the user may submit the digital copy of the $200.00 receipt to the expense management system 102. The expense management system 102 may identify information such as merchant name, amount ($200.00), date of the transaction (e.g. 12 Jul. 2011), location of the transaction (e.g. Texas City), etc. from the digital copy of the receipt. The expense management system 102 may then retrieve the plurality of ROCs, associated with recent transactions performed using the credit card, from the transaction server 108. The expense management system 102 may then match the digital copy of the receipt to one of the plurality of ROCs retrieved from the transaction server 110 based on information identified from the digital copy of the receipt. For example, the expense management system 102 may match the digital copy of the receipt to one of the ROCs based on any combination of vendor names, locations of similar transactions, time of similar transactions, and the like. Thus, based on an OCR of the digital copy of the receipt and the matching performed by the expense management system 102, a message may be displayed indicating that an airlines receipt for an amount $200.00 has been successfully submitted.

In case of cash and/or handwritten receipts, the identification unit 202 may utilize an OCR process in order to identify information from the receipt image or scanned copy. As no ROC is typically present for cash and handwritten receipts in the transaction database 114, the expense management system 102 may provide the user with an interface for editing the extracted information. For example, the user may enter the merchant name, client name for which the transaction was performed, and the like in the expense management system 102, through the user device 104.

With continued reference to FIG. 2, the expense management system 102 may assign the ROC, matched to the digital copy of the receipt, to an expense category. The ROC, to which the digital copy of the receipt is matched, may be provided to the assigning unit 206 by the matching unit 204. The assigning unit 206 may assign the ROC to one or more expense categories based on a number of parameters. These parameters may include a Standard Industrial Code (SIC) of the merchant or vendor, information related to previous matching activities for multiple ROCs, and the like. Further, as previously described, examples of the expense categories may include, without limitation, Travel, Food, Personal, Lodging, and the like. After assigning one or more of the ROCs to expense categories, the expense management system 102 may allow the user to associate ROCs to one or more clients and/or business organizations from which the user wishes to claim expenses.

Referring to the above stated example, the matching unit 204 may match the digital copy of the receipt to one of the plurality of ROCs, based on the information identified from the digital copy of the receipt. The assigning unit 206 may assign the ROC, matched to the digital copy of the receipt, to an expense category. The assigning unit 204 may assign the ROC to the expense category based, on for example, a SIC of the service provider. That is, if the SIC, as depicted by the digital copy of the receipt, is, for example, 4512 (e.g., a SIC for Air Transportation, Scheduled), the assigning unit 204 may assign the ROC to the expense category named "Travel".

The expense categories may be automatically generated by the system and/or may be user-defined. Thus, the user may assign all transactions accounted for travel to a single client or multiple clients.

Subsequent to assigning of the ROCs to the expense categories, the reporting unit 208 of the expense management system 102 may generate an expense report for the user. The expense report may have different sections indicating different parameters such as expense category, total amount for each expense category, client to whom the expenses are to be billed, and the like. The expense report may thus be used by the user in order to manage expenses. The user may also send the expense report to his business organization or to the accounting department of the client in order to reimburse the expenses stated in the expense report.

In various embodiments, the reporting unit 208 may send the expense report to the user device 104 (S6). The reporting unit 208 may also send a prompt on the user device 104 asking for an email ID of the user, so that the expense report may be directly mailed to the user. Further, the user may also enter an email ID of a Human Resource or Accounts department of the user's organization, and/or an email ID of the client accounting department, so that the reporting unit 208 may mail the expense report directly to the user's organization and/or to the accounting department of the client for whom the expenses were incurred by the user. Furthermore, the reporting unit 208 may send the expense report to an expense management tool. Examples of expense management tools may include MOBILEXPENSE, EXPENSEANYWHERE, EXPENSEWIRE, and the like.

Figure 3:
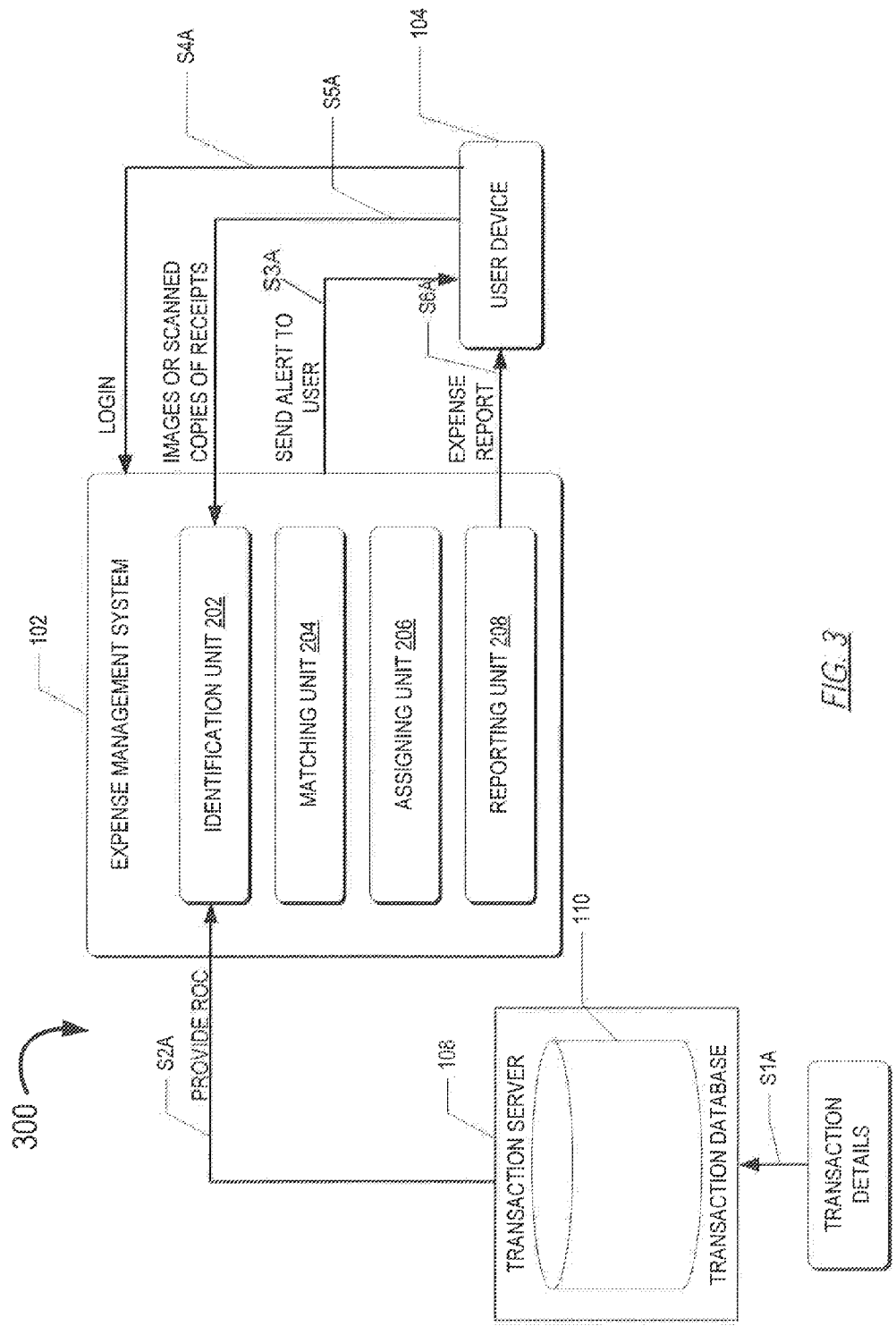
FIG. 3 illustrates an exemplary block diagram of a user delay process within the expense management system in accordance with various embodiments.

In various embodiments, and with reference to FIG. 3, transaction details for a purchase may be provided from the vendor's or merchant's database to the transaction server 108. The transaction details may be provided in real time to the transaction server 108 (e.g., as soon as the transaction is completed by the user and/or shortly thereafter) (S1A).

The transaction server 108 may query the transaction database 110 for retrieving a ROC associated with the transaction details. The transaction server may receive the ROC from the transaction database 110, and provide the ROC to the expense management system 102 (S2A). The matching unit 204 may receive the ROC from the transaction server 108.

The expense management system 102, may, in response, send an alert to the user requesting the user to submit the receipt associated with the transaction (S3A). The alert may be sent by the expense management system 102 to the user device 104. The alert may be in the form of an alarm, a text message, an E-mail, a push message, and the like. A text body of the alert may display time of the transaction, date of the transaction, amount of the transaction etc. to the user.

In various embodiments, the user may login into the expense management system 102 for submitting a digital copy of the receipt to the expense management system for further processing (S4A). Once the expense management system 102 authenticates the user, a successful login message may be sent to the user device 104.

The user, a user may submit the digital copy of the receipt to the expense management system 102. The user may also submit digital copies of receipts pertaining to transactions, other than the transaction for which the user has been sent the alert. For receipts pertaining to other transactions, the matching unit 204 may obtain the plurality of ROCs from the transaction server 108, as described earlier. The digital copies of the receipts may be received by the identification unit 202 of the expense management system 102 (S5A). The expense management system may send a "successfully submitted" message to the user device 104, when the digital copies of the receipts are successfully received by the identification unit 202.

In an alternate embodiment, the user may be provided an option of batch processing of the receipts, by the expense management system 102. For example, when the user logins into the expense management system 102, after receiving the alert, the expense management system 102 may allow the user to delay a submission of the digital copies of the receipts. That is, the user may have the option of either submitting the digital copies of the receipts as soon as the user logs in to the expense management system 102 or the user may opt to delay processing of the receipts. In the scenario that the user may opt to delay processing of the receipts, the user may either enter a fixed time period to delay the submission and processing of the receipts, or the user may simply delay it indefinitely. The user may then manually trigger the submission and processing of the receipts, in case of the indefinite delay.

In various embodiments, the identification unit 104 may identify information from the digital copies of the receipts. As described earlier, the identification unit 104 may identify the information from the digital copies of the receipts by means of OCR. Examples of the identified information may include name of vendor, merchant number, time stamp, total amount, and the like.

The identification unit 202 may then send the information identified from the digital copies of the receipts to the matching unit 204. For each receipt, the matching unit 204 may then match the digital copy of the receipt to one of the plurality of ROCs received from the transaction server 108 based on the information identified from the digital copy of the receipt. As described in the foregoing, the matching unit 204 may match the digital copy of the receipt to the ROC based upon a merchant identifier acquired from the digital copy, a transaction identifier acquired from the digital copy, a time stamp acquired from the digital copy, a total amount of a transaction acquired from the digital copy, and the like. If digital copy of each receipt successfully matches to the corresponding ROC, the expense management system 102 may continue processing of the receipts. On the other hand, if matching is unsuccessful, an indication may be sent, by the expense management system 102, to the user device 104.

Based on matching of the digital copy of the receipt to the ROC, the assigning unit 206 may assign the ROC to an expense category. The assigning unit 206 may assign the ROC to the expense category based on, for example, the SIC of the vendor or the merchant as depicted on the images or the scanned copies of the receipts. As described earlier, the expense management system 102 may allow the user to associate the ROCs to clients and/or business organizations from which the user wishes to reimburse incurred expenses.

In various embodiments, the reporting unit 208 may generate an expense report for all expenses, for which the digital copies of the receipts are submitted by the user. As described in the foregoing, the expense report may have different sections indicating different parameters such as expense category, total amount for each expense category, and the like. The reporting unit 208 may send the expense report to the user device 104 (S6A). In various embodiments, the expense management system 102 may prompt the user to enter a particular email ID to which the user wishes to mail the expense report directly. The reporting unit 208 may also send the expense report to one or more expense management tools.

Figure 4:
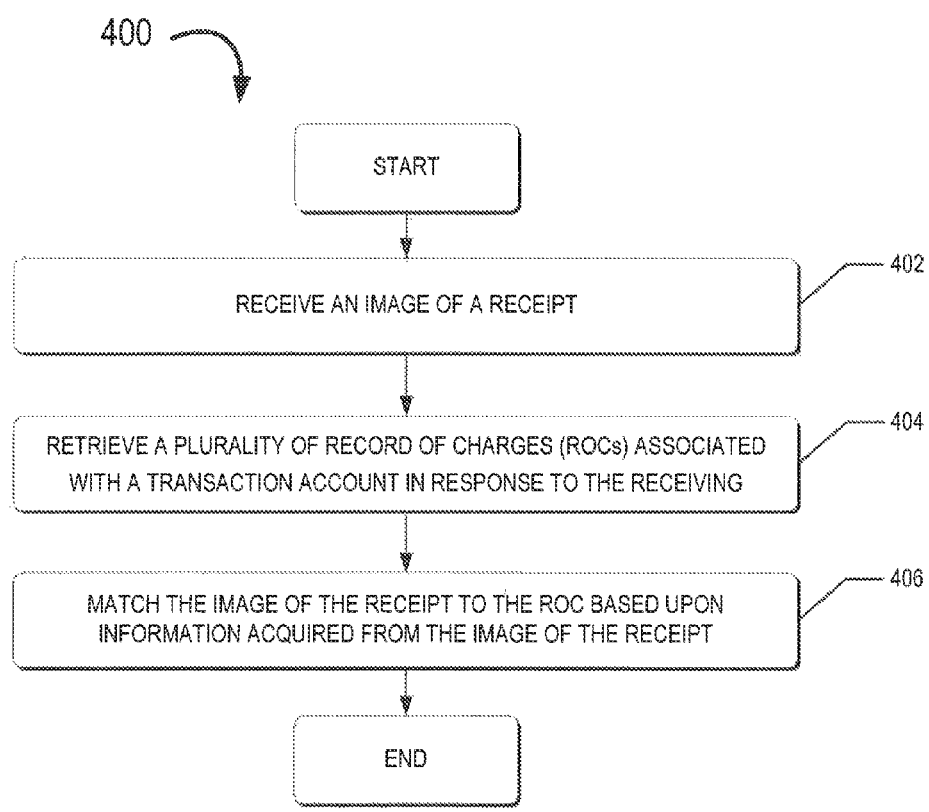
FIG. 4 illustrates an exemplary method of processing a receipt in response to receiving an image of the receipt in accordance with various embodiments.

FIG. 4 illustrates a method 400 of processing of a receipt in response to receiving an image of the receipt. In various embodiments, the digital copy of the receipt to be processed is received (step 402). As described earlier, the digital copy of the receipt may be received by the identification unit 202, of the expense management system 102, from the user device 104. The user may generate the digital copy of the receipt by taking a photograph of the receipt and/or by scanning the receipt.

In various embodiments, one or more of a plurality of ROCs associated with a transaction account may be retrieved (e.g., in response to receiving the digital copy of the receipt) (step 404). The plurality of ROCs may be retrieved by the matching unit 204 from the transaction server 108. The plurality of ROCs, in an example, may be unique identifiers identifying information pertaining to a transaction history of previous transactions against the transaction account of the user.

In various embodiments, the digital copy of the receipt may be matched to one of the plurality of ROCs (step 406). The matching unit 204 may match the digital copy of the receipt to one of the plurality of ROCs based on the information identified from the digital copy of the receipt. The information may be identified from the digital copy of the receipt by the identification unit 202 of the expense management system 102. The identification unit 202 may identify the information from the digital copy of the receipt, for example, by using OCR. The matching unit 204 may match the information identified from the digital copy of the receipt based on, for example, a merchant identifier acquired from the digital copy, a transaction identifier acquired from the digital copy, and the like.

In various embodiments, the ROC may be assigned to an expense category by the assigning unit 206 and an expense report may be generated by the reporting unit 208. The expense report may then be provided to the user.

Figure 5:
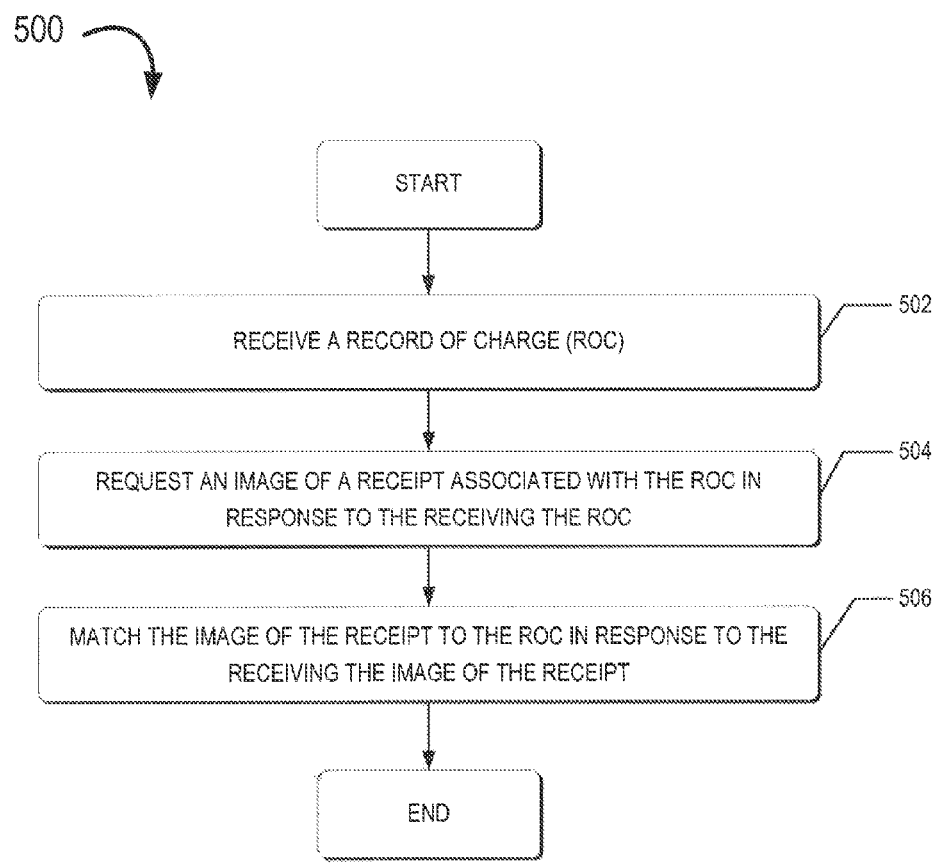
FIG. 5 illustrates an exemplary method for processing a receipt in response to receiving a record of charge (ROC) in accordance with various embodiments.

FIG. 5 illustrates a method 500 for processing of a receipt in response to receiving a record of charge (ROC). In various embodiments, a ROC is received (step 502). The ROC may be received by the matching unit 204, of the expense management system 102, from the transaction server 108. The transaction server 108 may provide the ROC to the expense management system 102 in response to receiving transaction details from the vendor's or merchant's database, for a transaction performed by the user.

In various embodiments, the expense management system 102 may request that the user submit the digital copy of the receipt associated with the ROC (step 504). The expense management 102 may send the request to the user device 104 in response to receiving the ROC from the transaction server 108. The request may be sent to the user device 104 in the form of an E-mail, a text message, a push notification, etc.

In various embodiments, the user may login into the expense management system 102 by any one of the techniques for logging in as described in the foregoing. The user may then submit the digital copy of the receipt to the expense management system 102. The user may submit the digital copy of the receipt using the user device 104.

In various embodiments, the matching unit 204 of the expense management system 102 may match the digital copy of the receipt to the ROC based on the information identified from the digital copy of the receipt (step 506). The information may be identified by the identification unit 202 of the expense management system 102. As described earlier, the information may be identified by the identification unit 202, for example, by OCR. In various embodiments, the assigning unit 206 may assign the ROC to an expense category and the reporting unit 208 may generate the expense report for sending to the user.

Figure 6:
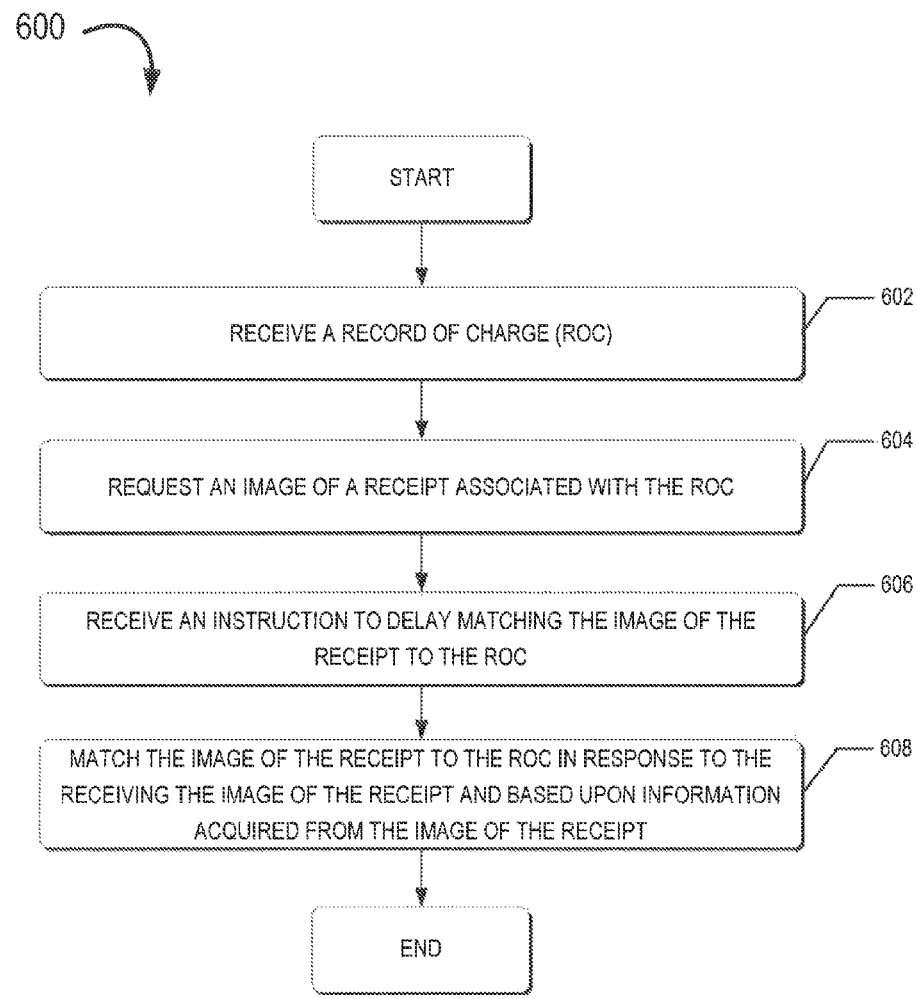
FIG. 6 illustrates an exemplary method for delayed processing of a receipt in response to receiving a ROC in accordance with various embodiments.

FIG. 6 illustrates a method 600 for delayed processing of a receipt in response to receiving a ROC. In various embodiments, a ROC is received (step 602). As described earlier, the ROC may be received by the matching unit 204 of the expense management system 102. The ROC may be received by the matching unit 204 from the transaction server 108.

In various embodiments, a request for submitting a digital copy of the receipt associated with the ROC may be sent by the expense management system 102 to the user (e.g., via the user device 104) (step 604). The request may be sent on the user device in the form of an alarm, an E-mail, and the like. In various embodiments, the user may login into the expense management system 102.

In various embodiments, the expense management system 102 may receive an instruction to delay the matching of the digital copy of the receipt to the ROC (step 606). The user may send the instruction for delaying the matching, e.g., using or by way of the user device 104. The user may also enter a pre-defined time period, such that after the pre-defined time period is elapsed, the expense management system 102 may re-send the request, for submitting the digital copy of the receipt to the user device 104. In various embodiments, the user may delay the matching indefinitely. In such a scenario, the user may manually trigger the matching at his convenience, using a manual trigger instruction.

At block 608, the matching unit 204 may match the digital copy of the receipt to the ROC. The matching unit 204 may match the digital copy of the receipt to the ROC in response to receiving the digital copy of the receipt, and, e.g., after the pre-defined time period as set by the user is elapsed. In various embodiments, the assigning unit 206 may assign the ROC to an expense category and the reporting unit 208 may generate the expense report and may send the expense report to the user.

Figure 7:
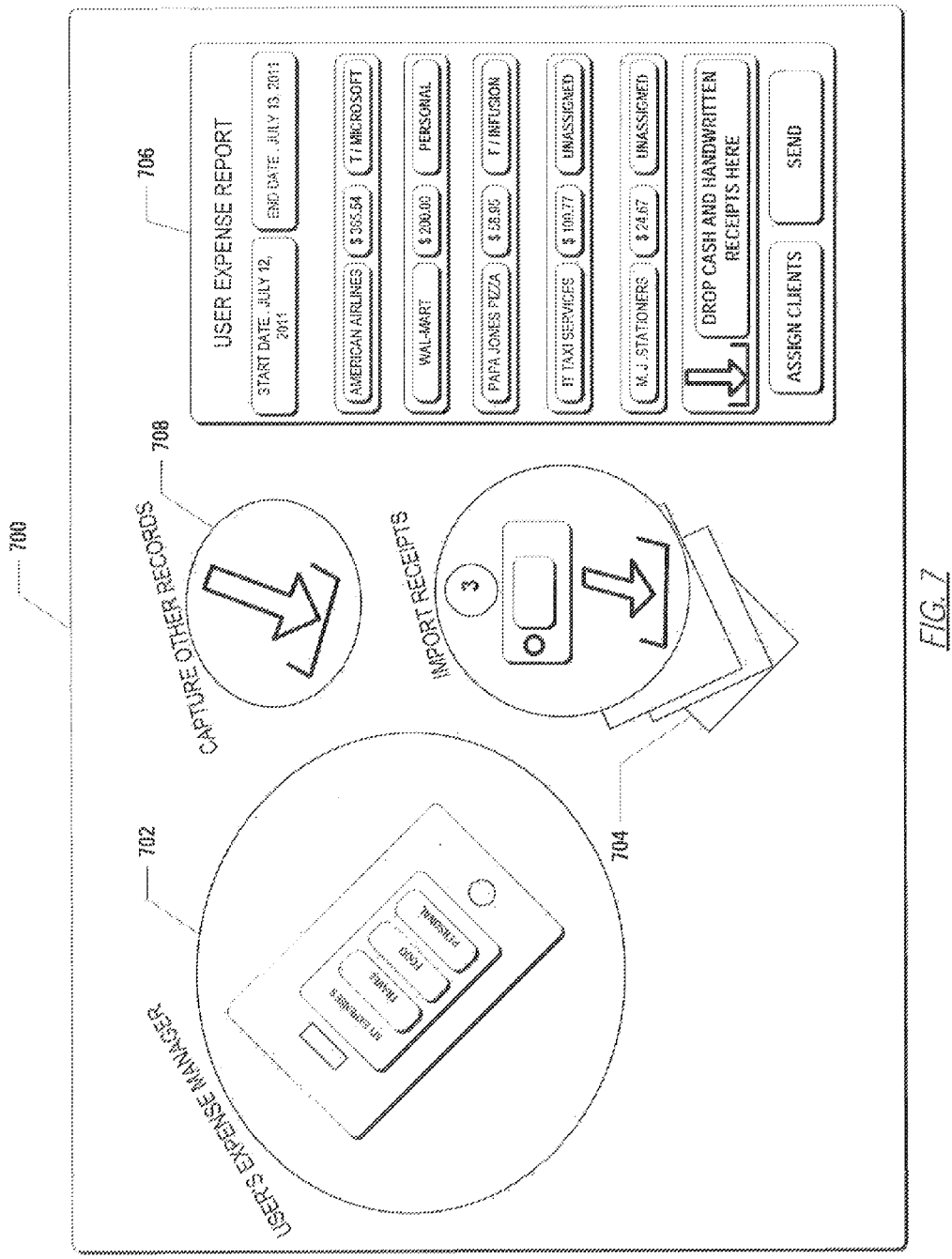
FIG. 7 illustrates an exemplary expense management system implemented on a MICROSOFT SURFACE table in accordance with various embodiments.

FIG. 7 illustrates an exemplary embodiment of the expense management system 102 as implemented on a tablet or table 700, such as a MICROSOFT SURFACE table. The expense management system 102 may have a plurality of surface divisions for performing different functionalities of the expense management system 102. The plurality of surface divisions may include a user device surface 702, a receipt surface 704, an expense report surface 706, and other records surface 708. The table 700 may be any a device that would preferably be web enabled (mobile, Wi-Fi or cat5), have touch capabilities (e.g. a touch capacitor) and/or be capable of capturing objects digitally (e.g. an Object Character Recognition device or a digital camera).

As illustrated in FIG. 7, the user device surface 702 may be illuminated by a display message saying, for example, "User Expense Manager". The user device surface 702 may be that surface division of the table 700, where the user may keep his user device 104. The user may place the user device 104 to login into the expense management system 102. The user may also place the user device 104 on the user device surface 702 in order that the receipts stored within the user device 104 may be submitted to the expense management system 102. Once the user is successfully logged in the expense management system 102, a "successful login" message may be displayed on the user device surface 702.

In various embodiments, a plurality of indicators on the receipts surface 704 may be illuminated and a display message reading, for example, "Import Receipts" may be displayed to the user. The user may place one or more receipts, which are to be submitted to the expense management system 102, on the receipt surface 704. Digital copies of the receipts may then be acquired and/or prepared by the table 700. The digital copies of the receipts may be acquired by the table 700 using one or more cameras or scanning devices embedded within the table 700. The receipt surface 704 may also indicate the number of receipts that are kept on the receipt surface 704, by means of Light Emitting Diodes (LEDs) present on the receipt surface 704. As illustrated in FIG. 7, the user has placed three receipts on the receipt surface 704, and thus the LEDs display a number 3 on the receipt surface 704. Further, the receipt surface 704 may also display a progress of the imaging of the one or more receipts, so that the user may be able to know the overall progress of the receipt imaging.

Further, as illustrated in FIG. 7, the receipt surface 702 may also display a mobile phone icon. The mobile phone icon may be displayed to the user in order that the user may submit receipts stored within the user device 104 directly to the expense management system 102. The receipts may be stored within a pre-defined location in an internal memory of the user device 104. The pre-defined location may be user-defined or may be a dedicated location for storing data, such as receipts, expense reports, etc. related to the expense management system 102.

In various embodiments, the expense management system 102 may retrieve one or more of a plurality ROCs related to the receipts from the transaction server 108. Moreover, for each receipt, a digital copy of the receipt may be matched to one of the plurality of ROCs based on the information identified from the digital copy. Each of the plurality of ROCs may be further assigned to different expense categories as described earlier, and the expense report may be generated by the expense management system 102.

Referring back to FIG. 7, the expense report surface 706 may, in various embodiments, display the expense report generated by the expense management system 102. The expense report surface may provide the user an option to edit the expense report generated by the expense management system. In an example described in FIG. 7, the user's expense report shows details for five different transactions performed by the user. A start date of Jul. 12, 2011 and an end date of Jul. 13, 2011 may, for example, be displayed on top of the user's expense report. The start date and the end date may be indicative of a time span in which multiple transactions are performed by the user for which the user submits one or more receipts.

As depicted, and for purposes of illustration, the user has submitted receipts for five different transactions for which the expense management system 102 has generated the expense report. The first receipt is for an amount of $365.54 and the name of the vendor is American Airlines. As shown, the user's expense report may show a block depicting T/Microsoft against the first transaction detail. The first letter in the depiction may indicate the expense category to which the transaction has been assigned. In the above example, "T" may stand for an expense category named "Travel". Further, the block may also depict "Microsoft" against the expense category. In an example "Microsoft" may be the client for which the expense was made. Thus, T/Microsoft may indicate that a transaction for an amount of $365.54 has been performed with American Airlines, and this transaction falls under the expense category Travel for the client named "Microsoft". Similarly for a transaction of $200.00 with Wal-Mart may have an expense category as "Personal" and as the transaction is a personal expense, no client name is indicated against the transaction.

Further, for unassigned transactions, such as $100.77 with IT Taxi Services, the user may be given an option to assign a client to the transactions. As depicted, a tab showing "unassigned" may be displayed in association with such transactions. The user may be provided with a tab showing "Assign clients" and by simply clicking on the tab, the expense management system 102 may provide the user with an interface for entering the client's name. Furthermore, another tab showing "Drop Cash and Hand written Receipts here" may be shown to the user within the expense report. The user may click on the tab and submit cash or hand written receipts into the expense management system 102. As, in this example, no ROCs are present for hand written or cash receipts, the table 700 may provide the user with an option to manually enter and save the client's name and expense category. Once all corrections and editing is done, the user may click on the "send" tab so that the expense management system 102 may send the expense report to a user-defined E-mail ID or expense management tool.

The table 700 may also display to the user the other records surface 708. The other records surface 708 may be used by the user in order to submit miscellaneous documents such as frequent client lists, frequent vendors or merchants' lists, expense categories for which maximum transactions are likely to be made, and the like. The expense management system 102 may use these miscellaneous documents in order to create the expense report.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in alternative embodiments.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website, a uniform resource locator ("URL"), a document (e.g., a Microsoft Word document, a Microsoft Excel document, an Adobe .pdf document, etc.), an "ebook," an "emagazine," an application or microapplication (as described below), an SMS or other type of text message, an email, facebook, twitter, MMS, data communication over a financial acquirer network, and/or other type of communication technology. In various embodiments, a channel may be hosted or provided by a data partner.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: user data, file system data, client data; merchant data; financial institution data; and/or like data useful in the operation of the system. As those skilled in the art will appreciate, user computer may include an operating system (e.g., Windows NT, Windows 95/98/2000, Windows XP, Windows Vista. Windows 7, OS2, UNIX, Linux, Solaris, MacOS, etc.) as well as various conventional support software and drivers typically associated with computers.

In various embodiments, the server may include application servers (e.g. WEB SPHERE, WEB LOGIC, JBOSS). In various embodiments, the server may include web servers (e.g. APACHE, IIS, GWS, SUN JAVA SYSTEM WEB SERVER).

As used herein, "transmit" may include sending electronic data from one system component to another over a network connection. Additionally, as used herein, "data" may include encompassing information such as commands, queries, files, data for storage, and the like in digital or any other form.

Phrases and terms similar to an "item" may include any good, service, information, experience, data, content, access, rental, lease, contribution, account, credit, debit, benefit, right, reward, points, coupons, credits, monetary equivalent, anything of value, something of minimal or no value, monetary value, non-monetary value and/or the like.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM (Armonk, N.Y.), various database products available from Oracle Corporation (e.g., MySQL) (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, in one exemplary embodiment, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit or monitor only certain individuals, levels of employees, companies, or other entities accessing data sets, or to permit or monitor access to specific data sets based on the transaction, merchant, issuer, user or the like. Furthermore, the security information may restrict, permit, and/or monitor only certain actions such as accessing, modifying, and/or deleting data sets. In one example, the data set annotation may indicate or track that only the data set owner or the user are permitted to delete a data set, various identified users may be permitted to access the data set for reading, and others are altogether excluded from accessing the data set. However, other access restriction or monitoring may also be used which may allow various entities to access a data set with various permission levels as appropriate, and/or which monitoring may also be used to track various entities (e.g., users or systems) accessing a data set with various permission levels. Thus, in various embodiments, tracking information may enable a system administrator to inquire into one or more user activities, which inquiry may permit the system administrator to adjust one or more access controls, modify one or more user groups or transaction clusters, and the like.

The data, including the header or trailer may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The system may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., AES, Twofish, RSA, El Gamal, Schorr signature, DSA, PGP, PKI, GPG (GnuPG) ECC, and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

A firewall may include any hardware and/or software suitably configured to protect CMS components and/or enterprise computing resources from users of other networks. Further, a firewall may be configured to limit or restrict access to various systems and components behind the firewall for web clients connecting through a web server. A firewall may reside in varying configurations including Stateful Inspection, Proxy based, access control lists, and Packet Filtering among others. A firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PI-IP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., Alex Nghiem, IT Web Services: A Roadmap for the Enterprise (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQTM (formerly MQSeries) by IBM, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

Each participant is equipped in various embodiments with a computing device in order to interact with the system and facilitate online commerce transactions. The customer has a computing unit in the form of a personal computer, although other types of computing units may be used including laptops, notebooks, hand held computers, set-top boxes, cellular or mobile telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein.

The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet® and the Veriphone® networks.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, a processing apparatus executing upgraded software, a stand alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The detailed description of exemplary embodiments of the present invention herein makes reference to the accompanying drawings and figures, which show the exemplary embodiments by way of illustration only. While these exemplary embodiments are described in sufficient detail to enable those skilled in the art to practice the present invention, it should be understood that other embodiments may be realized and that logical and mechanical changes may be made without departing from the spirit and scope of the present invention. It will be apparent to a person skilled in the pertinent art that this invention can also be employed in a variety of other applications. Thus, the detailed description herein is presented for purposes of illustration only and not of limitation. For example, the steps recited in any of the method or process descriptions may be executed in any order and are not limited to the order presented.

The present invention is described herein with reference to system architecture, block diagrams and flowchart illustrations of methods, and computer program products according to various aspects of the present invention. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flow diagram illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. §101.

Phrases and terms similar to "account", "account number", "account code" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account.

The system may include or interface with any of the foregoing accounts, devices, and/or a transponder and reader (e.g. RFID reader) in RF communication with the transponder (which may include a fob), or communications between an initiator and a target enabled by near field communications (NFC). Typical devices may include, for example, a key ring, tag, card, cell or mobile phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies. For more information regarding NFC, refer to the following specifications all of which are incorporated by reference herein: ISO/IEC 18092/ECMA-340, ISO 14443, Near Field Communication Interface and Protocol-1 (NFCIP-1); ISO/IEC 21481/ECMA-352, Near Field Communication Interface and Protocol-2 (NFCIP-2); and EMV 4.2 available at http://www.emvco.com/default.aspx.

The account number may be distributed and stored in any form of plastic, electronic, magnetic, radio frequency, wireless, audio and/or optical device capable of transmitting or downloading data from itself to a second device. A consumer account number may be, for example, a sixteen-digit account number, although each credit provider has its own numbering system, such as the fifteen-digit numbering system used by American Express. Each company's account numbers comply with that company's standardized format such that the company using a fifteen-digit format will generally use three-spaced sets of numbers, as represented by the number "0000 000000 00000". The first five to seven digits are reserved for processing purposes and identify the issuing bank, account type, etc. In this example, the last (fifteenth) digit is used as a sum check for the fifteen digit number. The intermediary eight-to-eleven digits are used to uniquely identify the consumer. A merchant account number may be, for example, any number or alpha-numeric characters that identify a particular merchant for purposes of account acceptance, account reconciliation, reporting, or the like.

In various embodiments, an account number may identify a consumer. In addition, in various embodiments, a consumer may be identified by a variety of identifiers, including, for example, an email address, a telephone number, a cookie id, a radio frequency identifier (RFID), a biometric, and the like.

The terms "payment vehicle," "financial transaction instrument," "transaction instrument" and/or the plural form of these terms may be used interchangeably throughout to refer to a financial instrument.

Phrases and terms similar to "internal data" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include, for example, consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

Phrases similar to a "payment processor" may include a company (e.g., a third party) appointed (e.g., by a merchant) to handle transactions. A payment processor may include an issuer, acquirer, authorizer and/or any other system or entity involved in the transaction process. Payment processors may be broken down into two types: front-end and back-end. Front-end payment processors have connections to various transaction accounts and supply authorization and settlement services to the merchant banks' merchants. Back-end payment processors accept settlements from front-end payment processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will then complete the payment transaction. In response to the verification being denied, the payment processor relays the information to the merchant, who may then decline the transaction. Phrases similar to a "payment gateway" or "gateway" may include an application service provider service that authorizes payments for e-businesses, online retailers, and/or traditional brick and mortar merchants. The gateway may be the equivalent of a physical point of sale terminal located in most retail outlets. A payment gateway may protect transaction account details by encrypting sensitive information, such as transaction account numbers, to ensure that information passes securely between the customer and the merchant and also between merchant and payment processor.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
   receiving, by a computer-based system, an image of a receipt, wherein the image of the receipt is captured by an app on a mobile device;
   retrieving, by the computer-based system and from a transaction processor system and in response to the receiving, a record of charge (ROC) associated with a transaction account,
   wherein the ROC is provided by a merchant via a merchant system to the transaction processor system,
   wherein the ROC includes a standard industrial classification (SIC) code of the merchant and a location associated with the ROC; and
   matching, by the computer-based system, the image of the receipt to the ROC based upon SIC code and location information acquired from the image of the receipt.

2. The method of claim 1, further comprising assigning, by the computer-based system, the ROC to a category of expense.

3. The method of claim 1, further comprising assigning, by the computer-based system, the ROC to a category of expense based upon at least one of: a standard industrial classification (SIC) code of the merchant, a category assigned to a different ROC, or a location associated with the ROC.

4. The method of claim 3, further comprising matching, by the computer-based system, the image of the receipt to the ROC based upon at least one of: a merchant identifier acquired from the image, an transaction identifier acquired from the image, a time stamp acquired from the image, or a total amount of a transaction acquired from the image.

5. The method of claim 4, further comprising:
   receiving, by the computer-based system, a plurality of images of a plurality of receipts, wherein the plurality of receipts are separated into individual receipts;
   retrieving, by the computer-based system, a plurality of records of charge (ROC) associated with a transaction account in response to the receiving; and
   matching, by the computer-based system, one of the plurality of images to one of the plurality of ROCs, based upon information acquired from each of the plurality of images.

6. The method of claim 5, further comprising submitting, by the computer-based system, the matched image and ROC to an expense management system.

7. The method of claim 6, further comprising receiving, by the computer-based system, at least one of a client name or project code to associate with the ROC.

8. A method comprising:
   receiving, by a computer-based system and from a transaction processor system, a record of charge (ROC),
   wherein the ROC is provided by a merchant via a merchant system to a transaction processor system,
   wherein the ROC includes a standard industrial classification (SIC) code of the merchant and a location associated with the ROC;
   requesting, by the computer-based system and to a mobile device, an image of a receipt associated with the ROC in response to the receiving the ROC;
   receiving, by the computer-based system, the image of the receipt associated with the ROC, wherein the image of the receipt is captured by an app on the mobile device; and matching, by the computer-based system, the image of the receipt to the ROC based upon SIC code and location information acquired from the image of the receipt, in response to the receiving the image of the receipt.

9. The method of claim 8, further matching, by the computer-based system, the image of the receipt to the ROC in response to receiving the image of the receipt within a period of time after transmitting an alert for the requesting.

10. The method of claim 9, further comprising receiving, by the computer-based system, an image of encoded data printed on the receipt separate from the image of the receipt.

11. The method of claim 10, further comprising assigning, by the computer-based system, the ROC to a category of expense.

12. The method of claim 11, further comprising assigning, by the computer-based system, the ROC to a category of expense based upon at least one of: a standard industrial classification (SIC) code of the merchant, a category assigned to a different ROC, or a location associated with the ROC.

13. The method of claim 12, further comprising assigning, by the computer-based system, the ROC to at least one of: a client or a project.

14. The method of claim 13, further comprising submitting, by the computer-based system, the matched image and ROC to an expense management system.

15. A method comprising:
receiving, by a computer-based system and from a transaction processor system, a record of charge (ROC),
wherein the ROC is provided by a merchant via a merchant system to a transaction processor system,
wherein the ROC includes a standard industrial classification (SIC) code of the merchant and a location associated with the ROC;
requesting, by the computer-based system and to a mobile device, an image of a receipt associated with the ROC;
receiving, by the computer-based system, an instruction to delay matching the image of the receipt to the ROC;
receiving, by the computer-based system and after a period of time, the image of the receipt associated with the ROC, wherein the image of the receipt is captured by an app on the mobile device; and
matching, by the computer-based system, the image of the receipt to the ROC in response to the receiving the image of the receipt and based upon the SIC code and location information acquired from the image of the receipt.

16. The method of claim 15, wherein the instruction to delay matching comprises inaction by a customer in response to an alert for the requesting.

17. The method of claim 16, further comprising receiving, by the computer-based system, at least one of a client name or project code to associate with the ROC.

18. The method of claim 17, further comprising matching, by the computer-based system, the image of the receipt to the ROC based upon at least one of: a merchant identifier acquired from the image, an transaction identifier acquired from the image, a time stamp acquired from the image, or a total amount of a transaction acquired from the image.

19. The method of claim 18, further comprising:
receiving, by the computer-based system, a plurality of images of a plurality of receipts, wherein the plurality of receipts are separated into individual receipts;
retrieving, by the computer-based system, a plurality of records of charge (ROC) associated with a transaction account in response to the receiving; and
matching, by the computer-based system, each of the plurality of images to each of the plurality of ROCs based upon information acquired from each of the plurality of images.

20. The method of claim 19, further comprising assigning, by the computer-based system, the ROC to a category of expense.

\* \* \* \* \*